Aug. 13, 1929.  F. P. KERSTEN  1,724,714
TRANSMISSION GEARING
Filed July 8, 1927  2 Sheets-Sheet 1
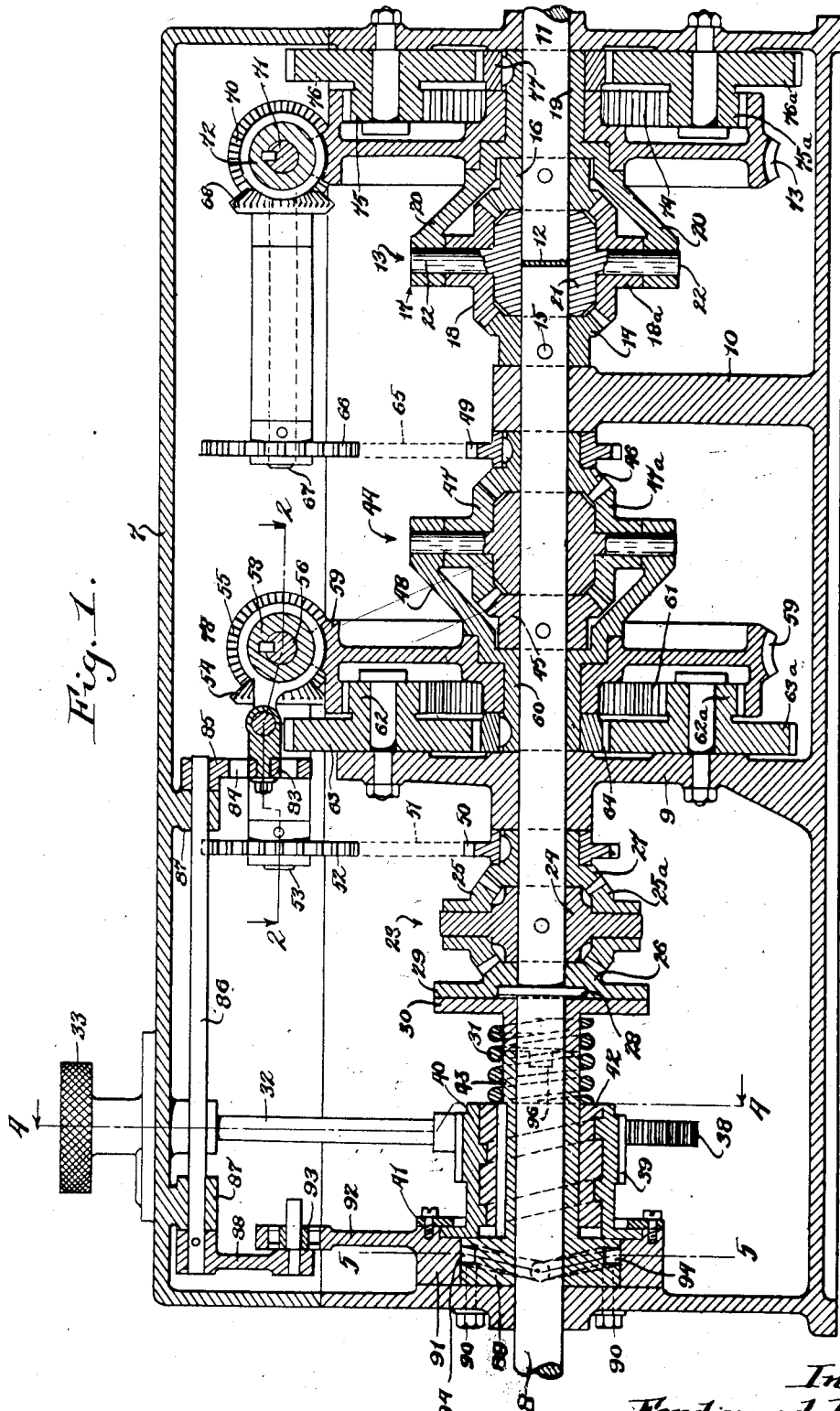
Inventor
Ferdinand P. Kersten
by Popp and Powris
Attorneys.

Aug. 13, 1929. F. P. KERSTEN 1,724,714
TRANSMISSION GEARING
Filed July 8, 1927 2 Sheets-Sheet 2
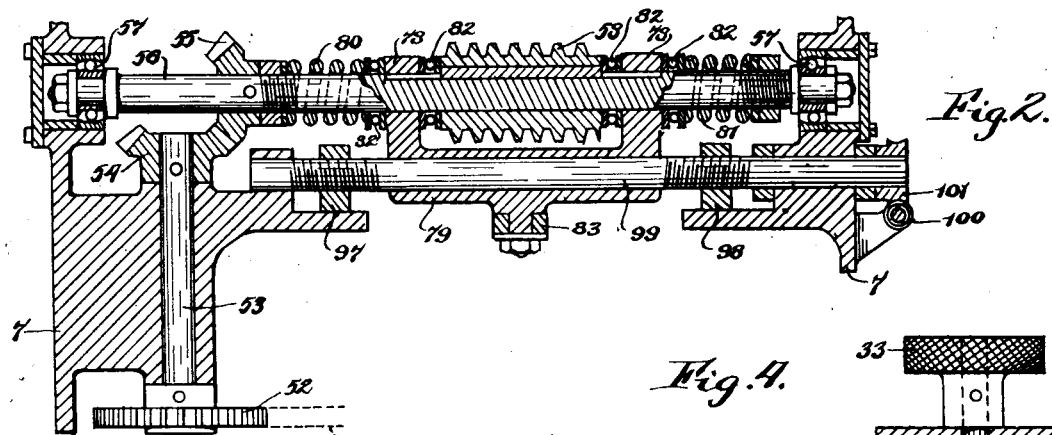
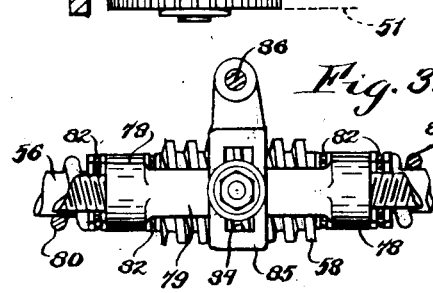
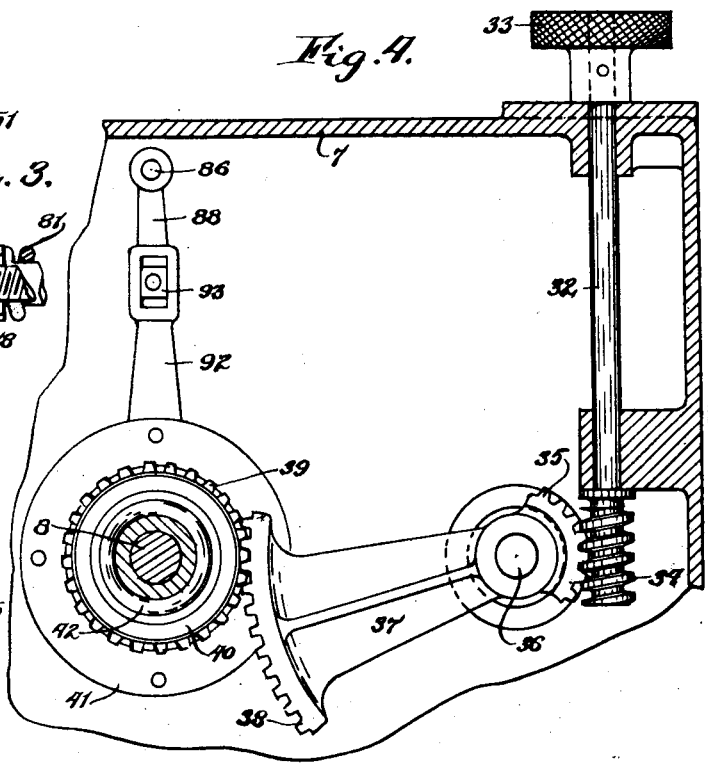
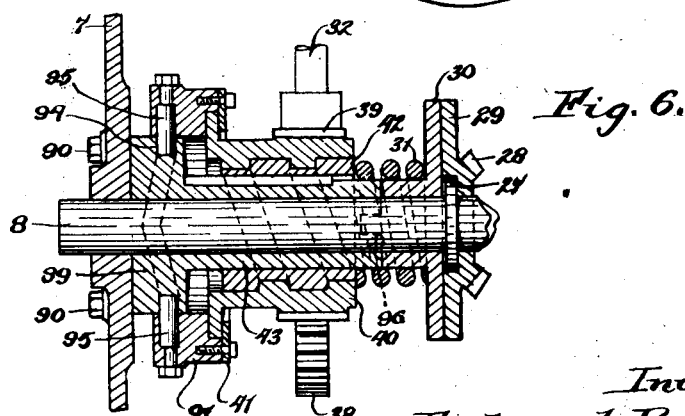
Inventor
Ferdinand P. Kersten
by Poppand Powers.
Attorneys.

Patented Aug. 13, 1929.

1,724,714

UNITED STATES PATENT OFFICE.

FERDINAND P. KERSTEN, OF EDEN, NEW YORK, ASSIGNOR OF ONE-HALF TO FORD BROS., A COPARTNERSHIP, OF BUFFALO, NEW YORK, COMPOSED OF WILLIAM H. FORD AND DANIEL E. FORD.

TRANSMISSION GEARING.

Application filed July 8, 1927. Serial No. 204,255.

This invention relates to a transmission gearing and more particularly to a variable speed transmission by which the speed of the driven shaft may be varied as requirements demand.

The principal object of this invention is to provide a variable speed transmission which will transmit speeds varying from zero to maximum with a minimum of loss of power in the transmission mechanism. Another object is to provide a variable speed transmission in which all of the gears are in constant mesh, and are completely housed thereby enabling the same to be run in oil.

Another object is to provide such a transmission which is adapted for either forward or reverse movement and in which the speed of the driven shaft may be varied from zero to the maximum speed, or any intermediate ratio.

A further object is to provide such a transmission gearing which can be operated under all conditions of its load, and in which the speed may quickly be changed without shock or undue wear to the working parts of the transmission.

A still further object is to provide means for automatically increasing the pull or torque of the driven shaft which means will maintain any desired speed regardless of changing loads or variable torques on the driven shaft.

Another aim is to provide a safety limit which prevents stalling of the driving or power shaft when an overload is placed on the driven shaft.

In the accompanying drawings:

Figure 1 is a longitudinal sectional view of a transmission gearing embodying my invention.

Figure 2 is a fragmentary horizontal transverse section taken approximately on line 2—2, Fig. 1.

Figure 3 is a fragmentary side view of the worm and yoke shown in Fig. 2.

Figure 4 is a fragmentary vertical transverse section taken approximately on line 4—4, Fig. 1, and showing the manual speed control mechanism.

Figure 5 is a vertical transverse section taken on line 5—5, Fig. 1.

Figure 6 is a longitudinal vertical section of the speed control mechanism showing it in its extreme position in which the driven shaft is carrying an overload.

Similar reference numerals indicate similar parts in the several figures of the drawings.

The transmission mechanism is contained in a housing 7, which may be of any suitable construction and completely encloses the gearing which preferably runs in a bath of oil. A horizontal drive shaft 8 is journaled in the housing and is preferably journaled at different points within the housing in supports 9 and 10. The driven shaft 11 is arranged axially in line with the drive shaft and the shafts are preferably separated by a spacer 12.

The drive between these shafts is effected by a differential indicated generally at 13 which includes a beveled gear 14 which is pinned to the drive shaft by a pin 15, a similar beveled gear 16 similarly pinned to the driven shaft, and a carrier 17 which is freely revolvable with respect to the driving and driven shafts and carries a plurality of beveled pinions 18, 18ª which mesh with the driving gear 14 and the driven gear 16. This carrier comprises a sleeve 19 supported on the driven shaft, arms 20 extending inwardly from this sleeve, and a hub 21 rotatably mounted on the two shafts and having radially extending arbors 22 which support the pinions 18, 18ª and are connected at their ends to the arms 20.

It is apparent that if the carrier 17 is held stationary, the driven shaft 11 is driven at the same speed as the driving shaft 8, but in a reverse direction through the differential gearing 14, 18, and 18ª, and 16. If, however, the carrier 17 is driven about its axis, the speed of the driven shaft is proportionately varied. For example, when the speed of the carrier 17 is continually increased from zero in a direction opposite to that of the drive shaft 8, the speed of the driven shaft 11 is thereby continually increased and when the carrier speed is continually increased in the opposite direction (with the drive shaft 8), the speed of the driven shaft 11 is initially reduced to zero and then continually increased in the reverse direction, that is to say in the same direction as the carrier 17 and the drive shaft 8. The present invention contemplates operating the carrier 17 in the same direction as the drive shaft 8 with a speed ranging from zero to a speed not greater than that necessary to bring the driven shaft 11 to a dead stop, such carrier speed being hereinafter referred to, for convenience, as the maximum speed of the carrier. When operated within this range it is apparent that the speed of the driven shaft is inversely proportional to the speed of the carrier and may be readily controlled by suitably driving the carrier. The movement of the carrier 17 to control the movement of the driven shaft is effected by intermediate mechanism which in turn may be controlled either manually or automatically.

The first controlling element is a speed controlling differential 23 which comprises a hub 24 pinned to the driving shaft 8, and carrying beveled pinions 25, 25$^a$ which mesh with opposed beveled gears 26, 27, these gears being loosely mounted on the driving shaft. The gear 26 is retained in engagement with the pinions 25, 25$^a$ by a collar 28, and this gear also carries a friction disc 29 against which pressure may be exerted by a non-rotatable pressure plate 30. The pressure plate 30 is axially slidable on the drive shaft and is yieldingly held against the friction disc 29 by a spring 31.

For manual control of this speed controlling differential, a shaft 32 is provided and is adapted to be turned by means of a knob 33 or in any other suitable manner. At its inner end this shaft carries a worm 34, as shown in Figure 4, which meshes with a worm gear segment 35 rotatably mounted on a longtiudinal shaft 36. This worm gear segment actuates an arm 37 carrying a spur gear segment 38 which meshes with and drives a spur gear 39 provided on a nut 40. The nut 40 is held against longitudinal movement by a retaining ring 41 and encloses and operates an externally threaded nut 42, this last named nut being keyed to and slidable longitudinally on a sleeve 43 and exerting an end thrust against the spring 31.

If frictional pressure of the pressure plate 30 on the friction disc is wholly relieved, the friction disc will be driven at its maximum speed inasmuch as the beveled gear 27 is under load and is therefore immovable in the absence of a reacting force at the opposite side of the differential. If, however, pressure is applied to the friction disc 29 in excess of that required to balance the resistance of the beveled gear 27, the latter will be driven at a rate of speed proportionate to the degree of pressure on the plate 30. It is apparent that the speed of the friction disc 29 is retarded in accordance with the degree of pressure exerted thereon by the pressure plate 30, and the lower the speed of the friction disc, the faster is the revolution of the gear 27, so that when the rotation of the friction disc has been entirely arrested by the pressure applied thereto by the friction plate 30, the gear 27 is rotated at its maximum permissive speed.

Upon turning the manually operated shaft 32, therefore the worm 34 actuates the worm gear segment 35, spur gear segment 38 and spur gear 39 to turn the outer nut 40 and thereby advance the inner nut 42 which, acting through the spring 31 and pressure plate 30 applies an increased pressure on the friction disc 29 and thereby causes the beveled gear 27 to be driven at an increased speed.

This speed control differential acts through an intermediate differential 44 to control the movement of the carrier 17 in the driving differential 13 and thereby control the rate of speed at which the driven shaft 11 is driven. This intermediate differential includes a driving beveled gear 45 fast on the driving shaft 8, a driven beveled gear 46 loosely mounted on this shaft, and a plurality of beveled pinions 47, 47$^a$ mounted on a carrier 48 and meshing with the gears 45 and 46 as in the driving differential 13. The carrier 48 and the driven beveled gear 46 are rotatably mounted on the drive shaft and the driven beveled gear has keyed thereto a sprocket wheel 49.

The driven beveled gear 27 of the controlling differential 23 carries a sprocket wheel 50 which is keyed thereto, and means are provided whereby the relation between the two differentials 23 and 44 is such that when the sprocket wheel 50 is rotating at maximum speed, the sprocket wheel 49 is stationary, and when the sprocket wheel 50 is stationary, the sprocket wheel 49 is rotating at maximum speed and for all intermediate speeds of the sprocket wheel 50 between zero and maximum, the sprocket wheel 49 rotates at proportionate rate between maximum and zero. This means as shown in the drawings is preferably constructed as follows:—

The sprocket wheel 50 is connected by a chain 51 to a large sprocket 52 which, as best shown in Fig. 2, is pinned to a shaft 53, supported from the side of the housing. At the other end of this shaft a beveled pinion 54 is mounted and meshes with a similar pinion 55 fixed to a transverse worm shaft 56. This shaft is supported at its opposite ends by roller bearings 57 on the sides of the housing, and adjacent its center has keyed thereto a worm 58. This worm is longitudinally movable on the worm shaft for a purpose which will presently appear. The worm 58 meshes with a large worm gear 59 which is rotatably mounted on a collar 60 forming part of the carrier 48, and drives this carrier through a train of multiplying gearing which includes an internal gear rim 61 formed on the inner face of the worm gear 59 and driving a pair of pinions 62, 62ª and gears 63, 63ª mounted on the standard 9, and a pinion 64 keyed to the collar 60 of the carrier 48 and meshing with the gears 63, 63ª. It is apparent that when the carrier 48 is stationary, the driven beveled gear 46 and the sprocket wheel 49 carried thereby are driven at maximum speed, and that when the carrier 48 is driven at maximum speed, the driven beveled gear 46 and sprocket wheel 49 are idle.

The sprocket wheel 49 is connected by a drive chain 65 with a large sprocket wheel 66 fast on a shaft 67. This shaft is mounted on the housing and at its other end carries a beveled pinion 68 which drives a similar beveled pinion 70 secured to a transverse worm shaft 71. This worm shaft has keyed thereto a worm 72 which meshes with and drives a large worm gear 73 which drives the carrier 17 through a train of speed increasing gearing including an internal gear rim 74 formed on the inner side of the worm gear which drives a pair of pinions 75, 75ª and gears 76, 76ª suitably mounted on the casing and a pinion 77 keyed on the collar 19 of this carrier and meshing with the gears 76, 76ª. When the sprocket wheel 49 is idle, the carrier 17 is, of course, stationary, and when the carrier 17 is stationary, the driven shaft is driven at its maximum speed. All other speeds of the carrier 17 from zero to maximum, are proportionate to zero to maximum speeds of the sprocket wheel 49 and the driven shaft will therefore be driven at corresponding maximum to zero speeds.

If, therefore, maximum pressure be applied by the pressure plate 30 on the friction disc 29 of the speed controlling differential 23, thereby to hold said friction disc stationary, sprocket wheel 50 travels at maximum speed, sprocket wheel 49 is stationary, carrier 17 is stationary and the driven shaft is driven at its maximum speed. Thus the speed of the driven shaft 11 is directly proportional to the speed of the carrier 48 of the intermediate differential 44 and is inversely proportional to the speed of friction disc 29 of the controlling differential 23.

The transmission gearing is available as reverse gearing and is operative in either direction of rotation of the drive shaft, the direction of rotation of the differential mechanism and the driven shaft being correspondingly reversed.

To apply greater pressure to the friction disc 29 and thereby increase the speed of the driven shaft when an increased load is placed on the driven shaft, an automatic control is provided which is preferably constructed as follows:

As best shown in Figs. 2 and 3, the worm 58 in the driving mechanism between the controlling differential 23 and the intermediate differential 44 is keyed on its shaft 56 so as to be slidable longitudinally thereon. This worm is fitted between the arms 78 of a yoke 79 and is held in centered or neutral position by opposed helical springs 80, 81. Suitable roller thrust bearings 82 are preferably provided to reduce friction between these members. With an increase in the load on the driven shaft 11, the frictional resistance of the worm 58 at the worm wheel 59 is increased with the result that there is a tendency to slide the worm in one direction on the shaft 56.

The yoke 79 carries a roller 83 which is arranged in a slot 84 in a depending rock lever 85. This rock lever is suitably secured to a rock shaft 86 which is supported in hangers 87 and at its other end carries a second rock lever 88. The sleeve 43 which carried the nuts 40 and 42 is formed at its outer end to provide an enlarged head 89 which engages the outer end of the outer nut 40, and is secured to the end wall of the housing 7 by a plurality of bolts 90. On this head is rotatably mounted a sleeve 91 which carries the retaining ring 41 and is rocked by a slotted lever 92 which is connected at its upper end to the lower end of the rock lever 88 by a sliding connection 93. The head 89, as best shown in Fig. 5 has an annular cam groove 94 and the sleeve 91 has a pair of oppositely located pins 95 which engage the cam groove. The bearing sleeve 43 holds the bearing plate 30 against turning by means of an interlocking connection 96 between these parts.

Assuming the worm 58 to be in neutral position shown in Fig. 2, an increase in the load on the driven shaft 11 causes the increased frictional resistance of the worm wheel 59 to shift the worm 58 and the yoke 79 and rock the rock levers 85 and 88. The rock lever thereby rocks the lever 92 which rotates the sleeve 91 causing the pins 95 carried thereby, to ride along the cam groove 94 and shift the sleeve 91 inwardly as shown in Fig. 6. This movement of the sleeve 91 carries the nuts 40 and 42 inwardly thereby compressing the spring 31 against the pressure plate 30 and increasing the resistance of this plate to the rotation of the friction disc 29, and thereby, increase the speed of the driven shaft 11 through the controlling differential 23, intermediate differential 44 and driving differential 13 as previously described. In this way the driven shaft 11 is caused to be driven at a uniform or constant speed. In like manner when the load on the driven shaft is reduced, if the pressure on the friction disc 29 remains constant, the tendency would be for the friction disc 29 to rotate faster, but such reduction of the load on the shaft lowers the frictional resistance at the worm wheel 59 with the result that the worm 58 slides back toward neutral position and effects a backward movement of the nuts 40, 42 and a proportionate relief of pressure on the friction disc 29 and thereby overcomes the tendency of the driven shaft to run at a higher speed.

The yoke which effects this automatic regulation of the speed of the driven shaft is movable between stops 97 and 98, as shown in Fig. 2. If the load on the driven shaft increases to a point where the yoke strikes an adjacent stop, maximum pressure will then have been applied to the friction disc 29 by the pressure plate 30, and for any further increase in the load the friction disc will slip relative to the pressure plate. An automatic relative reduction of the speed of the driven shaft is thus effected by an over load on the driven shaft.

Two stops are provided to limit the movement of the worm in either direction of rotation of the driven shaft, and these stops are preferably adjustable toward and from each other by mounting the same on a threaded rod 99, having a right hand thread moving one stop and a left hand thread moving the other stop, so that upon turning the shaft, simultaneous inward or outward movement of the stops is effected. The rotation of the shaft 99 to effect adjustment of the stops is preferably effected by a worm 100 and a worm wheel 101 actuated in any suitable manner from the outside of the housing.

It is obvious that the intermediate and controlling differential may be driven from any suitable source of power to effect a control of the speed transmitted by the driving differential and the invention is not, therefore, limited to the use of the main drive shaft 8 as the source of power for these differentials.

It will also be noted that under certain conditions of the load the driven shaft may become the driving shaft, such for example as when the forward momentum of the load exceeds the power of the driving shaft, and under such circumstances, the worm 72 becomes a driving member and a relatively powerful action of the intermediate differential 44 is necessary to hold the driven shaft to the predetermined speed. The worm 58 controlling the driving differential acts solely as a driving member and the force exerted by the controlling differential 23 therefore need only be sufficient to overcome the friction of the carrier 48 and its associated parts and rotate the same at the desired speed. It therefore follows that by the use of three differentials, the loss of power in the transmission is relatively slight, inasmuch as a small differential, requiring little power to operate, and having correspondingly small losses through the friction control thereof, may be employed to regulate the speed at which the driven shaft is run.

As a whole this invention is comparatively simple considering the function it performs. The gears are in constant mesh, and completely housed; the speed of the driven shaft is variable from zero to maximum speed; the speed may be quickly changed without injury to the moving parts, and it automatically adapts itself to increased loads or torques and overloads.

I claim as my invention:—

1. In a transmission gearing operable to transmit motion at an indefinite number of speeds varying from zero to maximum, a driving shaft and a driven shaft, a driving differential operable to transmit motion from said driving to said driven shaft at varying speeds, an intermediate differential controlling the movement of said driving differential, a controlling differential controlling the movement of said intermediate differential, means for actuating said controlling and intermediate differentials and means for controlling the movement of said controlling differential, to transmit motion at an indefinite number of speeds varying from zero to maximum.

2. In a transmission gearing operable to transmit motion at an indefinite number of speeds varying from zero to maximum, a driving shaft and a driven shaft, a driving differential operable to transmit motion from said driving to said driven shafts at varying speeds, an intermediate differential driven by said driving shaft and controlling the movement of said driving differential, a controlling differential driven by said driving shaft and controlling the movement of said intermediate differential and means for controlling the movement of said controlling differential, to transmit motion at an indefinite number of speeds varying from zero to maximum.

3. In a transmission gearing operable to transmit motion at an indefinite number of speeds varying from zero to maximum, a driving shaft rotating at a constant speed, a driven shaft, a driving differential transmitting motion from said driving to said driven shaft and including a movable member operable to vary the speed of said driven shaft from zero to maximum, an intermediate differential controlling the movement of said movable member in said driving differential, means for actuating said intermediate differential and means for controlling the movement of said intermediate differential comprising a controlling differential driven by said driving shaft and means for controlling the movement of said controlling differential to drive said intermediate differential at an indefinite number of speeds varying from zero to maximum.

4. In a transmission gearing operable to transmit motion at an indefinite number of speeds varying from zero to maximum, a driving shaft rotating at a constant speed, a driven shaft, a driving differential transmitting motion from said driving to said driven shafts, an intermediate differential, each of said differentials including a movable member operable to vary from zero to maximum the speed transmitted thereby, means actuated by said intermediate differential for controlling the movement of said movable member of said driving differential, and a controlling differential for controlling the movement of said movable member of said intermediate differential, means for driving said controlling differential, and means, for controlling the movement of said controlling differential to drive said intermediate differential at an indefinite number of speeds varying from zero to maximum speed.

5. In a transmission gearing operable to transmit motion at an indefinite number of speeds varying from zero to maximum, a driving shaft rotating at a constant speed, a driven shaft, a driving differential transmitting motion from said driving to said driven shafts and including a movable member operable to vary the speed of said driven shaft, an intermediate differential, means for actuating said intermediate differential, means for driving said movable member of said driving differential through motion derived from said intermediate differential, said intermediate differential including a movable member operable to vary the speed transmitted thereby, and a controlling differential for driving said movable member in said intermediate differential, means for driving said controlling differential, and means for controlling the movement of said controlling differential to drive said movable member at an indefinite number of speeds varying from zero to maximum.

6. In a transmission gearing operable to transmit motion at an indefinite number of speeds varying from zero to maximum, a driving shaft rotating at a constant speed, a driven shaft, a driving differential transmitting motion from said driving to said driven shafts and operable to drive said driven shaft at an indefinite number of speeds, an intermediate differential operable to transmit motion at indefinite speeds, means for controlling said driving differential through motion derived from said intermediate differential, a controlling differential including a movable member operable when retarded to vary the speed transmitted by said controlling differential, means for controlling said intermediate differential through motion derived from said controlling differential and manually operated means for progressively retarding the movement of said movable member in said controlling differential.

7. A structure as set forth in claim 6, wherein said retarding means include a pressure controlling member movable toward and from said controlling differential, a friction member actuated by said pressure controlling member and adapted to engage said movable member in said controlling differential and means for actuating said pressure controlling member through motion derived from the resistance of said driven shaft.

8. In a transmission gearing, a driving shaft, a driven shaft, a driving differential transmitting motion from said driving to said driven shaft and operable to drive said driven shaft at varying speeds, an intermediate differential operable to transmit motion at varying speeds, means for controlling said driving differential through motion derived from said intermediate differential, a controlling differential including a movable member operable when retarded to vary the speed transmitted by said controlling differential, means for controlling said intermediate differential through motion derived from said controlling differential, a nut adapted to be moved toward and from the controlling differential, a friction member actuated by said nut and adapted to engage and retard the movement of said movable member in said controlling differential, and means for actuating said nut.

9. In a transmission gearing, a driving shaft, a driven shaft, a driving differential transmitting motion from said driving to said driven shaft and operable to drive said driven shaft at varying speeds, an intermediate differential operable to transmit motion at varying speeds, means for controlling said driving differential through motion derived from said intermediate differential, a controlling differential including a movable member operable when retarded to vary the speed transmitted by said controlling differential, means for controlling said intermediate differential through motion derived from said controlling differential, an externally threaded nut movable longitudinally toward and from said controlling differential, a friction member actuated by said nut and adapted to engage and retard the movement of said movable member in said controlling differential, an internally threaded nut engaging said externally threaded nut and adapted when turned to move said externally threaded nut toward and from said controlling differential, manually operable means for turning said internally threaded nut and means actuated through motion derived from said driven shaft to move both of said nuts toward and from said controlling differential.

10. In a transmission gearing, a driving shaft, a driven shaft, a driving differential transmitting motion from said driving to said driven shaft and operable to drive said driven shaft at varying speeds, an intermediate differential operable to transmit motion at varying speeds, means for controlling said driving differential through motion derived from said intermediate differential, a controlling differential including a movable member operable when retarded to vary the speed transmitted by said controlling differential, means for controlling said intermediate differential through motion derived from said controlling differential, a sleeve adjacent said controlling differential and held against movement, an externally threaded nut keyed on said sleeve and movable toward and from said controlling differential, a friction member actuated by said nut and adapted to engage and retard the movement of said movable member in said controlling differential, an internally threaded nut engaging said externally threaded nut, and normally held against movement toward and from said controlling differential, manually operable means for turning said internally threaded nut, and cam means actuated through motion derived from said driven shaft for moving both of said nuts toward and from said controlling differential.

11. In a transmission gearing, a driving shaft, a driven shaft, a driving differential operable to transmit motion from said driving to said driven shaft at varying speeds, an intermediate differential controlling the movement of said driving differential, a controlling differential controlling the movement of said intermediate differential, means for actuating said controlling and intermediate differentials, and means responsive to the load on said driven shaft for controlling the movement of said controlling differential.

12. In a transmission gearing, a driving shaft, a driven shaft, a driving differential operable to transmit motion from said driving to said driven shaft at varying speeds, an intermediate differential controlling the movement of said driving differential, a controlling differential controlling the movement of said intermediate differential, means for actuating said controlling and intermediate differentials, a movable worm wheel operatively connected to said driven shaft and movable in response to the load on said shaft and means for controlling said controlling differential through motion derived from the movement of said worm.

13. In a transmission gearing, a driving shaft, a driven shaft, a driving differential transmitting motion from said driving to said driven shaft and operable to drive said driven shaft at varying speeds, an intermediate differential operable to transmit motion varying speeds, means for controlling said driving differential through motion derived from said intermediate differential, a controlling differential including a movable member adapted when retarded to vary the speed transmitted by said controlling differential, means operable to retard the movement of said movable member, a longitudinally movable worm and a worm wheel operatively connected with said driving shaft, and said driven shaft, yielding means tending to hold said worm in a neutral position, said worm being longitudinally movable by the resistance of said worm wheel, and means for actuating said retarding means through motion derived from the longitudinal movement of said worm.

14. A structure as set forth in claim 13, wherein adjustable stop means are provided to limit the movement of said worm.

15. In a transmission gearing, a driving shaft, a driven shaft, a driving differential transmitting motion from said driving to said driven shaft and operable to drive said driven shaft at varying speeds, an intermediate differential operable to transmit motion at varying speeds, means for controlling said driving differential through motion derived from said intermediate differential, a controlling differential including a movable member adapted when retarded to vary the speed of movement transmitted by said controlling differential, means operable to retard the movement of said movable member, means for controlling the movement of said intermediate differential through motion derived from said controlling differential, and including a worm wheel and a longitudinally movable worm driving said worm wheel, yielding means tending to hold said worm in a neutral position, said worm being longitudinally movable by the resistance of said worm wheel and means for actuating said retarding means through motion derived from the longitudinal movement of said worm.

16. In a transmission gearing, a driving shaft, a driven shaft, a driving differential operable to transmit motion from said driving to said driven shaft at varying speeds, an intermediate differential controlling the movement of said driving differential, a controlling differential controlling the movement of said intermediate differential, means for actuating said controlling and intermediate differentials, and means for controlling the movement of said controlling differential through motion derived from the load on said driven shaft including a worm gear operatively connected with said driven shaft, a worm engaging said worm gear and operatively connected with said driving differential, said worm being longitudinally movable by the resistance of said worm wheel and means for controlling the movement of said controlling differential through motion derived from the longitudinal movement of said worm.

In testimony whereof I affix my signature.

FERDINAND P. KERSTEN.